(12) United States Patent
Xiang et al.

(10) Patent No.: US 9,423,080 B2
(45) Date of Patent: Aug. 23, 2016

(54) LAMP AND VEHICLE COMPRISING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Weimin Xiang, Guangdong (CN); Minjing Pan, Guangdong (CN); Hongjun Wang, Guangdong (CN); Jianing Pan, Guangdong (CN); Caihua Pan, Guangdong (CN); Qianghua Zeng, Guangdong (CN); Dongxue Han, Guangdong (CN); Jianxiong Li, Guangdong (CN); Liujie Shi, Guangdong (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/288,839

(22) Filed: May 28, 2014

(65) Prior Publication Data

US 2014/0355288 A1 Dec. 4, 2014

(30) Foreign Application Priority Data

May 30, 2013 (CN) .......................... 2013 1 0208718
May 30, 2013 (CN) ...................... 2013 2 0305246 U

(51) Int. Cl.
*B60Q 1/00* (2006.01)
*F21K 99/00* (2016.01)
*B60Q 3/02* (2006.01)

(52) U.S. Cl.
CPC ................ *F21K 9/30* (2013.01); *B60Q 3/0203* (2013.01); *B60Q 3/025* (2013.01)

(58) Field of Classification Search
CPC .......... F21K 9/30; B60Q 3/0203; B60Q 3/025
See application file for complete search history.

(56) References Cited

U.S. PATENT DOCUMENTS

| | | | |
|---|---|---|---|
| 2006/0092649 A1 | 5/2006 | Bynum | |
| 2006/0209558 A1* | 9/2006 | Chinniah et al. | 362/545 |
| 2006/0250812 A1* | 11/2006 | Butz et al. | 362/545 |
| 2008/0074889 A1 | 3/2008 | Gloisten et al. | |

(Continued)

FOREIGN PATENT DOCUMENTS

| | | |
|---|---|---|
| CN | 101094779 A | 12/2007 |
| CN | 101776237 A | 7/2010 |

(Continued)

OTHER PUBLICATIONS

PCT International Search Report and Written Opinion mailed Aug. 15, 2014, issued in International Application No. PCT/CN2014/077571 (13 pages).

*Primary Examiner* — Evan Dzierzynski
(74) *Attorney, Agent, or Firm* — Finnegan, Henderson, Farabow, Garrett & Dunner, LLP

(57) ABSTRACT

A lamp for a compartment of a vehicle includes: a base, a mounting plate disposed on the base and having a power source receiving part, a power source received in the power source receiving part, and a lamping source disposed on the mounting plate and having a luminous region of a sector shape. The power source receiving part is located at a side of the lamping source.

19 Claims, 3 Drawing Sheets

(56) References Cited

U.S. PATENT DOCUMENTS

2013/0021815 A1* 1/2013 Koizumi .................. 362/511
2014/0078770 A1* 3/2014 Grote et al. .............. 362/542

FOREIGN PATENT DOCUMENTS

| CN | 201992533 U | 9/2011 |
| CN | 202040713 U | 11/2011 |
| CN | 202188419 U | 4/2012 |
| CN | 102519002 A | 6/2012 |
| CN | 202392644 U | 8/2012 |
| CN | 102734722 A | 10/2012 |
| CN | 202719493 U | 2/2013 |
| CN | 203322948 U | 12/2013 |
| DE | 10306397 A1 | 8/2004 |
| JP | 2009-245846 A | 10/2009 |
| WO | WO 2014/190855 A1 | 12/2014 |

* cited by examiner

LAMP AND VEHICLE COMPRISING THE SAME

CROSS REFERENCE TO RELATED APPLICATIONS

This application claims priority to and benefits of Chinese Patent Application Serial Nos. 201320305246.0 and 201310208718.5, both filed with the State Intellectual Property Office (SIPO) of P. R. China on May 30, 2013, the entire contents of which are incorporated herein by reference.

FIELD

The present disclosure relates to vehicles, more particularly to a lamp for a compartment of a vehicle and a vehicle including the same.

BACKGROUND

LED, LEDs are widely used in vehicles, for example, as an interior lamp in a compartment of a vehicle. However, luminance of LEDs is often not uniform, and a bright lamp-emitting area is often not large enough, for example, within 30 mm. Even the lamp having a wide cross-section of a lamp door, except the bright lamp-emitting area, other areas may not be bright enough.

Because of the uneven luminance of the LEDs, the illuminated area of the compartment may not be large enough, and the efficiency of the LED lamp may be low.

SUMMARY

In view thereof, the present disclosure is directed to solve at least one of the problems existing in the prior art.

Accordingly, a lamp for a compartment of a vehicle may be provided, which may improve the luminance uniformity and the efficiency of the lamp.

Further, a vehicle including the lamp may also be provided.

According to an aspect of the present disclosure, a lamp for a compartment of a vehicle may be provided. The lamp may include: a base; a mounting plate disposed on the base and having a power source receiving part; a power source received in the power source receiving part; and a lamping source disposed on the mounting plate and having a luminous region of a sector shape, wherein the power source receiving part is located at a side of the lamping source.

In some embodiments, the power source is disposed outside of the luminous region of the lamping source.

In some embodiments, the sector has a radius ranging from 10 mm to 100 mm.

In some embodiments, the lamping source includes at least one row of LEDs, and each row includes at least two LEDs.

In some embodiments, a distance between adjacent LEDs ranges from 0.5 mm to 30 mm.

In some embodiments, the power source receiving part is formed integrally with the mounting plate.

In some embodiments, the mounting plate defines a first end fixed with the base, and a second end; and the power source receiving part is formed by bending the second end of the mounting plate inwardly with a first bending angle to form a first bending portion, and bending a part of the first bending portion inwardly with a second bending angle to form a second bending portion.

In some embodiments, the first bending angle is larger than the second bending angle.

In some embodiments, the lamp further includes a lamp cover fixed to the base and covering the lamping source.

In some embodiments, the sector has a radius ranging from 10 mm to 100 mm, and wherein the radius is defined as the shortest distance between the lamping source and the lamp cover.

In some embodiments, a transmittance of the lamp cover ranges from 75% to 95%.

In some embodiments, a thickness of the lamp cover ranges from 0.6 mm to 3 mm.

In some embodiments, a first male snap is formed integrally on the mounting plate; and a second male snap is formed integrally on the base disposed against the first male snap.

In some embodiments, the lamp cover has a first female snap for engaging with the first male snap, and a second female snap for engaging with the second male snap.

In some embodiments, the first male snap is formed by bending a part of the second bending portion outwardly to form a third bending portion, and bending a part of the third bending portion outwardly; and the second male snap is formed by bending an end of the base inwardly to form a fourth bending portion, and bending a part of the fourth bending portion outwardly.

In some embodiments, the lamp further includes a lamping source fixing part formed on the mounting plate for fixing the lamping source.

In some embodiments, the lamp further includes a lamping source fixing plate disposed on the lamping source fixing part for connecting with the lamping source.

In some embodiments, the lamping source fixing plate is a printed circuit board.

In some embodiments, the lamping source includes at least one row of LEDs each having a luminous region, and the luminous regions of the at least one row of LEDs constitute the luminous region of the lamping source.

According to another aspect of the present disclosure, a vehicle may be provided. The vehicle may include the lamp as described above.

With the lamp and the vehicle according to embodiments of the present disclosure, the power source receiving part is located at a side of the lamping source, and the power source is received in the power source receiving part, that is, the power source is disposed outside of the luminous region of the lamping source, such that there is no shading generated, and the luminance uniformity won't be affected. In addition, the power source is located at a side of the lamping source, which won't increase the height of the lamp, thereby taking less space.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
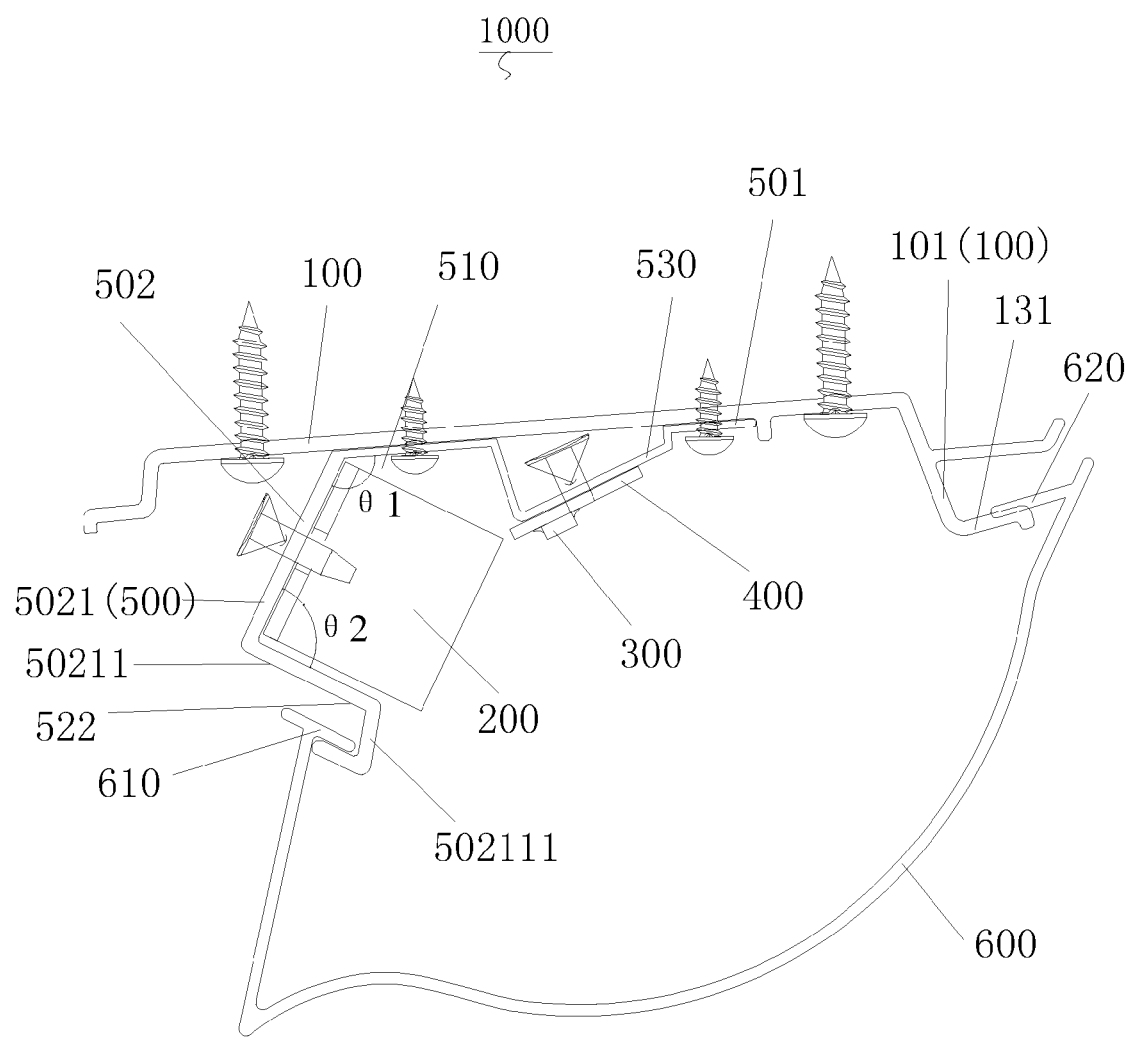
FIG. 1 is a schematic view illustrating a lamp for a compartment of a vehicle according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Figure 2:
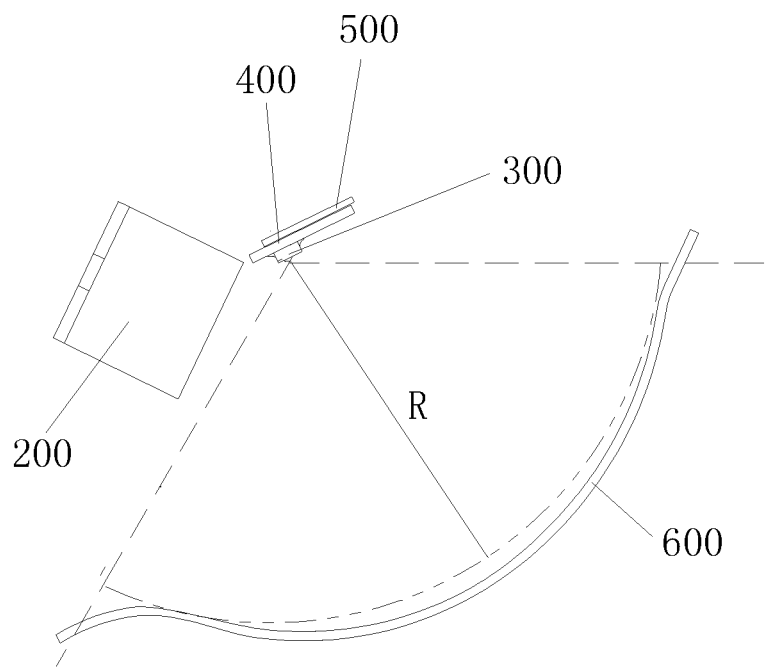
FIG. 2 is a schematic view illustrating a luminous region of a lamping source of a lamp according to an embodiment of the present disclosure.
Figure 3:
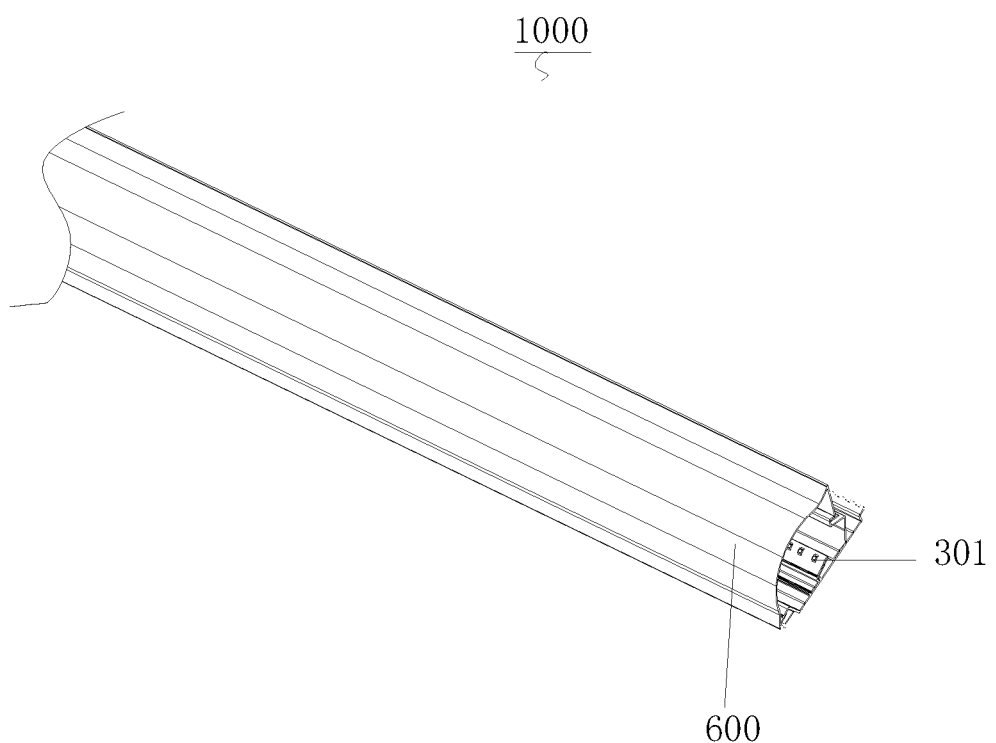
FIG. 3 is a schematic view illustrating a lamp according to an embodiment of the present disclosure.

A lamp for a compartment of a vehicle according to embodiments of the present disclosure will be described with reference to FIGS. 1-3.

As shown in FIG. 1, the lamp 1000 includes: a base 100; a mounting plate 500 disposed on the base 100, and having a power source receiving part 510; a power source 200 received in the power source receiving part 510; and a lamping source 300 disposed on the mounting plate 500 and having a luminous region of a sector shape. The power source receiving part 510 is located at a side of the lamping source 300.

The power source 200 is received in the power source receiving part 510. The lamping source 300 is fixed on the base 100. The power source receiving part 510 is located at a side of the lamping source 300. As seen in FIG. 1, the power source 200 is disposed outside of the luminous region of the lamping source 300, such that there is no shading generated, and the luminance uniformity is not affected. In addition, the power source 200 is located at a side of the lamping source 300, which does not increase the height of the lamp, thereby taking less space. In an embodiment, the power source 200 may include at least one battery to provide the power to the lamping source 300.

In some embodiments, the lamping source 300 includes at least one row of LEDs 301, and each row includes at least two LEDs 301. Each LED 301 has a luminous region, and the luminous regions of the at least one row of LEDs 301 constitute the luminous region of the lamping source 300. In an embodiment, a distance between adjacent LEDs 301 ranges from 0.5 mm to 30 mm, such that the LEDs 301 are arranged evenly without wasting LEDs 301, thereby reducing the cost, and a luminance of the LED 301 is uniform when the LEDs 301 emits light. Furthermore, the LEDs are energy-saving and environmental-friendly.

In some embodiments, the power source receiving part 510 is formed integrally with the mounting plate 500.

The mounting plate 500 has a first end 501 and a second end 502. The first end 501 is fixed with the base 100. The power source receiving part 510 is formed by bending the second end 502 of the mounting plate 500 inwardly with a first bending angle θ1 to form a first bending portion 5021, and then bending a part of the first bending portion 5021 inwardly with a second bending angle θ2 to form a second bending portion 50211. The first bending angle θ1 is larger than the second bending angle θ2. "Outwardly" here refers to a direction away from the interior of the lamp 1000, and "inwardly" here refers to a direction toward the interior of the lamp 1000.

With the power source receiving part 510 formed integrally with the mounting plate 500, the assembling procedure of the power source receiving part 510 is saved, such that the efficiency is improved, and the lamp 1000 is easier to assemble.

In some embodiments, the lamp 1000 further includes a lamp cover 600 fixed to the base 100 and covering the lamping source 300. The luminous region of the lamping source 300 has a sector shape. The sector has a radius ranging from 10 mm to 100 mm. The radius R is defined as the shortest distance between the lamping source 300 and the lamp cover 600. By defining the radius range of the sector, the lamp 1000 would emit soft light, and may reduce the energy waste.

In an embodiment, the material of the lamp cover 600 may be made from PC (polycarbonates). A transmittance of the lamp cover 600 may range from 75% to 95%, and a thickness of the lamp cover 600 may range from 0.6 mm to 3 mm. Transmittance is the fraction of incident light (electromagnetic radiation) at a specified wavelength that passes through a sample.

In some embodiments, in order to assemble the lamp cover 600 onto the lamp 1000 or disassemble the lamp cover 600 from the lamp 1000, a first male snap 522 is formed integrally on the mounting plate 500, and a second male snap 131 is formed integrally on the base 100 disposed against the first male snap 522. The lamp cover 600 has a first female snap 610 for engaging with the first male snap 522, and a second female snap 620 for engaging with the second male snap 131.

In an embodiment, the first male snap 522 is formed by bending a part of the second bending portion 50211 outwardly to form a third bending portion 502111, and then bending a part of the third bending portion 502111 outwardly. The second male snap 131 is formed by bending an end of the base 100 inwardly to form a fourth bending portion 101, and then bending a part of the fourth bending portion 101 outwardly.

In some embodiments, the lamp 1000 further includes a lamping source fixing part 530 for fixing the lamping source 300. In an embodiment, the lamp 1000 further includes a lamping source fixing plate 400 disposed on the lamping source fixing part 530 for connecting with the lamping source 300. In an embodiment, the lamping source fixing plate 400 is a printed circuit board (PCB), which is electronically connected with the lamping source 300.

Figure 4:
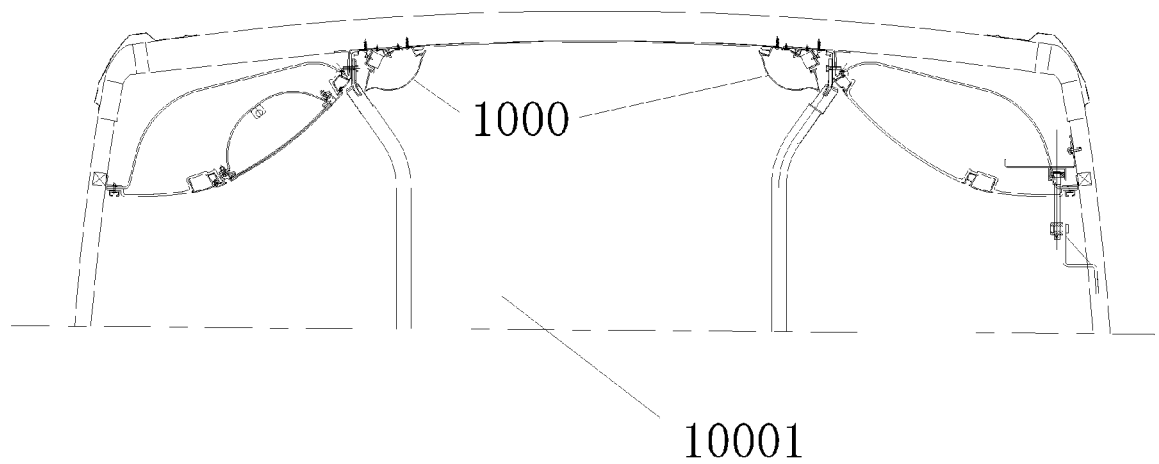
FIG. 4 is a schematic view illustrating a vehicle according to an embodiment of the present disclosure.

As shown in FIG. 4, according to embodiments of the present disclosure, a vehicle 10000 including the lamp 1000 as described above is provided.

The vehicle 10000 includes a compartment 10001, and the lamp 1000 is disposed in the compartment 10001 for illuminating the compartment 10001. The lamp 1000, as described above, includes: a base 100; a mounting plate 500 disposed on the base 100, and having a power source receiving part 510; a power source 200 received in the power source receiving part 510; and a lamping source 300 disposed on the mounting plate 500 and having a luminous region of a sector shape. The power source receiving part 510 is located at a side of the lamping source 300.

With the lamp according to embodiments of the present disclosure, the power source receiving part is located at a side of the lamping source, and the power source is received in the power source receiving part. In other words, the power source is disposed outside of the luminous region of the lamping source, such that there is no shading generated, and the luminance uniformity is not affected. In addition, the power source is located at a side of the lamping source, which does not increase the height of the lamp, thereby taking less space.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A lamp for a compartment of a vehicle, comprising:
a base;
a mounting plate disposed on the base and having a power source receiving part, the mounting plate defining a first end fixed with the base, and a second end; wherein the second end of the mounting plate comprises a first surface, a second surface, and a third surface, wherein the first and the second surfaces form a first bending portion with a first bending angle, wherein the second and the third surfaces form a second bending portion with a second bending angle, and wherein the first, second, and third surfaces form the power source receiving part;
a power source received in the power source receiving part; and
a lamping source disposed on a surface of the mounting plate that faces away from the base and having a luminous region of a sector shape, wherein the power source receiving part is located at a side of the lamping source.

2. The lamp according to claim 1, wherein the power source is disposed outside of the luminous region of the lamping source.

3. The lamp according to claim 1, wherein the sector has a radius ranging from 10 mm to 100 mm.

4. The lamp according to claim 1, wherein the lamping source comprises at least one row of LEDs, and each row comprises at least two LEDs.

5. The lamp according to claim 4, wherein a distance between adjacent LEDs ranges from 0.5 mm to 30 mm.

6. The lamp according to claim 1, wherein the power source receiving part is formed integrally with the mounting plate.

7. The lamp according to claim 1, wherein the first bending angle is larger than the second bending angle.

8. The lamp according to claim 1, further comprising a lamp cover fixed to the base and covering the lamping source.

9. The lamp according to claim 8, wherein the sector has a radius ranging from 10 mm to 100 mm, and wherein the radius is defined as the shortest distance between the lamping source and the lamp cover.

10. The lamp according to claim 8, wherein a transmittance of the lamp cover ranges from 75% to 95%.

11. The lamp according to claim 8, wherein a thickness of the lamp cover ranges from 0.6 mm to 3 mm.

12. The lamp according to claim 8, wherein a first male snap is formed integrally on the mounting plate; and
wherein a second male snap is formed integrally on the base disposed against the first male snap.

13. The lamp according to claim 12, wherein the lamp cover has a first female snap for engaging with the first male snap, and a second female snap for engaging the second male snap.

14. The lamp according to claim 12, wherein the first male snap comprises a third bending portion integrated with the second bending portion; and
wherein the second male snap comprises a fourth bending portion integrated with the base.

15. The lamp according to claim 1, further comprising a lamping source fixing part formed on the mounting plate for fixing the lamping source.

16. The lamp according to claim 15, further comprising a lamping source fixing plate disposed on the lamping source fixing part for connecting with the lamping source.

17. The lamp according to claim 16, wherein the lamping source fixing plate includes a printed circuit board.

18. The lamp according to claim 1, wherein the lamping source comprises at least one row of LEDs each having a luminous region, and the luminous regions of the at least one row of LEDs constitute the luminous region of the lamping source.

19. A vehicle, comprising the lamp according to claim 1.

* * * * *